United States Patent
Nagata

(10) Patent No.: US 8,218,085 B2
(45) Date of Patent: *Jul. 10, 2012

(54) SIGNAL SEPARATOR

(75) Inventor: Mitsutoshi Nagata, Obu (JP)

(73) Assignee: DENSO CORPORATION, Kariya (JP)

( * ) Notice: Subject to any disclaimer, the term of this patent is extended or adjusted under 35 U.S.C. 154(b) by 1327 days.

This patent is subject to a terminal disclaimer.

(21) Appl. No.: 11/889,801

(22) Filed: Aug. 16, 2007

(65) Prior Publication Data

US 2008/0088745 A1    Apr. 17, 2008

(30) Foreign Application Priority Data

Oct. 11, 2006   (JP) .................... 2006-277788

(51) Int. Cl.
H04N 9/77   (2006.01)
H04N 9/78   (2006.01)

(52) U.S. Cl. ........ 348/663; 348/664; 348/665; 348/666; 348/667; 348/668; 348/669; 348/670

(58) Field of Classification Search .................. None
See application file for complete search history.

(56) References Cited

U.S. PATENT DOCUMENTS

| | | |
|---|---|---|
| 4,694,331 A | 9/1987 | Law et al. |
| 5,025,311 A | 6/1991 | Hosoi |
| 5,047,866 A | 9/1991 | Watanabe et al. |
| 5,099,315 A | 3/1992 | Koga et al. |
| 5,909,255 A | 6/1999 | Hatano |
| 2006/0077302 A1 * | 4/2006 | Nieuwenhuizen ............ 348/665 |
| 2008/0088738 A1 | 4/2008 | Nagata |
| 2008/0088745 A1 | 4/2008 | Nagata |

FOREIGN PATENT DOCUMENTS

| | | |
|---|---|---|
| JP | A-S61-41290 | 2/1986 |
| JP | A-61-191189 | 8/1986 |
| JP | A-S64-19891 | 1/1989 |
| JP | A-4-87495 | 3/1992 |
| JP | A-H8-242464 | 9/1996 |
| JP | A-9-163398 | 6/1997 |

OTHER PUBLICATIONS

Office Action dated Apr. 27, 2009 from German Patent Office in the corresponding DE Application No. 102007000716.9 (and English Translation).

Office Action dated Apr. 23, 2009 from German Patent Office in the corresponding DE Application No. 102007000715.0 (and English Translation).

(Continued)

Primary Examiner — Kristine Kincaid
Assistant Examiner — James Marandi
(74) Attorney, Agent, or Firm — Posz Law Group, PLC

(57) ABSTRACT

A signal separator for separating luminance and color signals from a composite video signal includes: a first band pass element for passing a part of the composite video signal within a color signal band and within a predetermined frequency band; a second band pass element for passing a part of the first filtered signal within the color signal band and without the predetermined frequency band; and a first subtraction element for subtracting the first filtered signal from the composite video signal, wherein the predetermined frequency band is a frequency range in which the separation of the composite video signal into the color and the luminance signals is difficult.

5 Claims, 4 Drawing Sheets

OTHER PUBLICATIONS

Schonfelder, H.: Fernsehtechnik [Television Technology] Part 2, Justus Von Liebig Verlag (ed.), Darmstadt, IDBN 3873900432, 1973, pp. 12/13B, 12/14B, 12/14, 12/15B, 12/15 (and English Translation).

U.S. Appl. No. 11/889,800, filed Aug. 16, 2007, Nagata.

Office Action mailed on Jun. 24, 2011 from the US Patent Office issued in related U.S. Appl. No. 11/889,800.

Office Action mailed Aug. 16, 2011 in related JP application No. 2006-277789 (and English translation).

Written Directive mailed Aug. 16, 2011 in corresponding JP application No. 2006-277788 (and English translation).

Office Action mailed Aug. 16, 2011 in corresponding JP application No. 2006-277788 (and English translation).

Office Action dated Dec. 27, 2011 in U.S. Appl. No. 11/889,800.

\* cited by examiner

SIGNAL SEPARATOR

CROSS REFERENCE TO RELATED APPLICATIONS

This application is based on Japanese Patent Application No. 2006-277788 filed on Oct. 11, 2006, the disclosure of which is incorporated herein by reference. This application is also related to U.S. application Ser. No. 11/889,800, entitled "SIGNAL SEPARATOR," filed simultaneously on Aug. 16, 2007 with the present application.

FIELD OF THE INVENTION

The present invention relates to a signal separator.

BACKGROUND OF THE INVENTION

A television receiver requires separating a color signal and a luminance signal from a composite video signal. A simple method for separating the signals is, for example, a method with using a band pass filter (i.e., BPF) or a method with using a comb filter.

The method with using a BPF is described as follows. A composite video signal is input into the BPF. The color signal desired is an output signal of the BPF. The luminance signal desired is the subtraction result of the predetermined color signal from the composite video signal. Here the BPF has the ability that the BPF passes only a signal component within a color-signal-band. The method using a comb filter is described as follows. The luminance signal desired is the addition result between a one-line-delayed composite video signal and a non-delayed composite video signal. The color signal desired is the subtraction result of the one-line delayed composite-video-signal from the non-delayed composite video signal. Here, the separation is executed using the information on a phase correlation between the lines.

The two methods mentioned above are easy to perform but result in quality losses of videos such as that due to cross color and dot interference.

An addition of a field memory and a complicated circuit on a display is a method for improving the video quality loss. An example is shown in JP-A-H09-163398, in which the following technique is presented. Output signals of the field delay circuit and the line delay circuit are input into filters. Then output signals of these filters are to be desired signals by selecting the output signals. The selection of the output signals is made based on the decorrelation-detection-result obtained by limiting a band in relation to time, vertical, and horizontal components.

An application of a complicated circuit is shown in JP-A-H09-163398 to a small display such as a vehicle display and a mobile display, however, leads to display devices having a much bigger sized circuit than its screen size. Moreover, some information losses of a video signal may not be relevant to an actual video quality for audiences in use in taking into account the screen area of the display. An application of the large circuit exampled in JP-A-H09-163398 to the small display provides an overmuch resolution in use. The small display having a complicated circuit is shown in JP-A-H09-163398 poses problems of a non-suitable sized circuit for the display and the overmuch resolution in use. Thus, what is required is a signal separator without having a large circuit. Further, it is required for the signal separator to provide an appropriate video quality with reducing quality loss such as that due to cross color and dot interference.

SUMMARY OF THE INVENTION

In view of the above-described problem, it is an object of the present disclosure to provide a signal separator.

According to a first aspect of the present disclosure, a signal separator for separating a luminance signal and a color signal from a composite video signal includes: a first band pass element for passing a part of the composite video signal within a color signal band and within a predetermined frequency band, and outputting a filtered signal as a first filtered signal; a second band pass element for passing a part of the first filtered signal within the color signal band and without the predetermined frequency band, and outputting a filtered signal as a second filtered signal; and a first subtraction element for subtracting the first filtered signal from the composite video signal, and outputting a subtracted signal as a first subtraction signal, wherein the predetermined frequency band is a frequency range in which the separation of the composite video signal into the color and the luminance signals is difficult.

According to the above separator, the subtraction element provides the luminance signal that does not include a signal component within the predetermined band, and the second band pass element provides the color signal that does not include the signal component within the predetermined band. The separator provides an appropriate video quality without having a large circuit.

According to a second aspect of the present disclosure, a signal separator for separating a luminance signal and a color signal from a composite video signal includes: a first line delay element for delaying the composite video signal by one line period, and outputting a delayed signal as a first delay signal; a second line delay element for delaying the composite video signal by two line periods, and outputting a delayed signal as a second delay signal; a correlation determination element for determining a correlation among the composite video signal, the first delay signal and the second delay signal, and outputting a determined correlation as a correlation signal; a first band pass element for passing a part of the first delay signal within a color signal band and within a predetermined frequency band, and outputting a filtered signal as a first filtered signal; a second band pass element for passing a part of the first filtered signal within the color signal band and without the predetermined frequency band, and outputting a filtered signal as a second filtered signal; a first subtraction element for subtracting the first filtered signal from the first delay signal, and outputting a subtracted signal as a first subtraction signal; an adder element for adding the first and second delay signals, and outputting an added signal as a addition signal; a second subtraction element for subtracting the second delay signal from the first delay signal, and outputting a subtracted signal as a second subtraction signal; a first selector for selecting one of the first subtraction signal and the addition signal base on the correlation signal, and outputting a selected signal as the luminance signal; and a second selector for selecting one of the second filtered signal and the second subtraction signal based on the correlation signal, and outputting a selected signal as the color signal, wherein the predetermined frequency band is a frequency range in which separation of the composite video signal into the color and the luminance signals is difficult.

According to the above separator, when the subtraction element provides the luminance signal, the luminance signal does not include a signal component within the predetermined band. When the second band pass element provides the color signal, the color signal does not include the signal component within the predetermined band. The separator provides an appropriate video quality without having a large circuit. Since the adder element and the second subtraction element, respectively, provide the luminance signal and the color signal based on the correlation signal, a further video quality improvement is possible.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
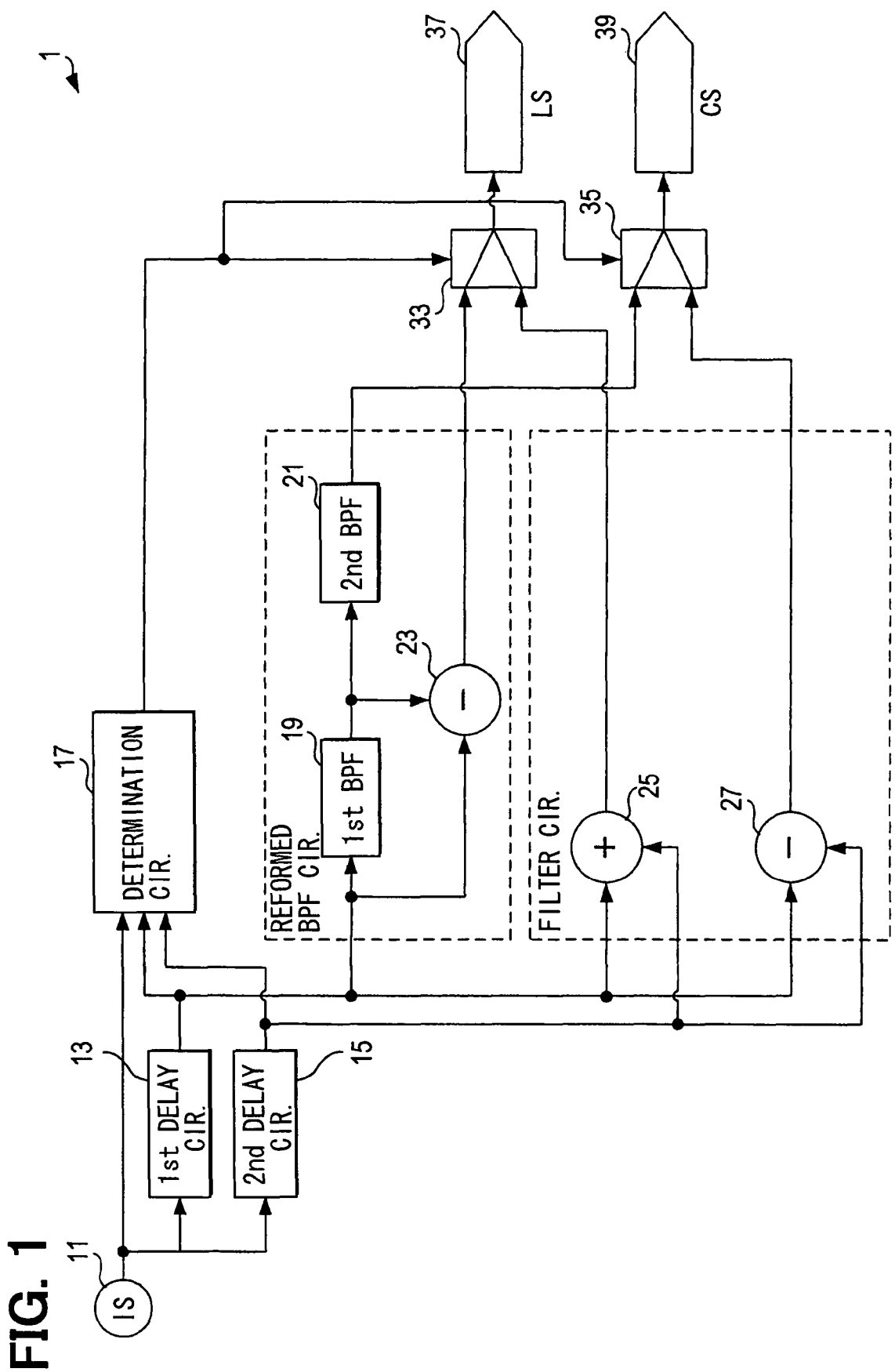
FIG. 1 is a schematic block diagram of a signal separator 1 according to a first embodiment.

FIG. 1 shows a schematic block diagram of a signal separator 1. A signal-input-terminal 11 is inputting a NTSC-standard composite-video-signal IS (i.e., input signal) including a color-signal and a luminance-signal into the separator 1. The composite-video-signal input through the signal-input-terminal 11 is output to a first line-delay-circuit 13, a second line-decay-circuit 15 and a correlation-determination-circuit 17.

The first line-delay-circuit 13 delays the composite-video-signal by one line period. The one-line-delayed composite-video-signal is output to the correlation-determination-circuit 17, a first BPF 19, a first subtracting-circuit 23, an adder-circuit 25 and a second subtracting-circuit 27.

A second line-delay-circuit 15 delays the composite-video-signal by two line periods. The two-line-delayed composite-video-signal is output to the correlation-determination-circuit 17, the adder-circuit 25 and the second subtracting-circuit 27.

The correlation-determination-circuit 17 executes a correlation determination among the composite-video-signal, the one-line-delayed composite-video-signal and the two-line-delayed composite-video-signal. Then the correlation-determination-circuit 17 outputs a switching-signal to a first selector 33 and a second selector 35. Here, a switching signal "ON" is output when the correlation among the above signals exceeds a threshold value, and a switching signal "OFF" is output when the correlation does not exceed the threshold value. The threshold value is adjusted based on the videos that are produced by color-signals and luminance-signals, where the color signal CS and luminance signal LS are output from a color-signal-output-terminal 39 and a luminance-signal-output-terminal 37, respectively.

The one-line-delayed composite-video-signal is input into the first BPF 19. The first BPF 19 passes only a signal component within a first predetermined frequency band, and outputs a filtered signal to a second BPF 21 and a first subtracting circuit 23. An explanation is given later on the first predetermined frequency band.

The output signal of the first BPF 19, which has only a signal component within the first predetermined frequency band, is input into the second BPF 21. The second BPF 21 passes only a signal component within a second predetermined frequency band, and output a filtered signal to a second selector 35. An explanation is given later on the second predetermined frequency band.

The first subtracting-circuit 23 executes a subtraction of the output signal of the first BPF 19 from the one-line-delayed composite-video-signal. Here the output signal of the first BPF has only a signal component within the first predetermined frequency band. The signal subtracted is output to the first selector 33.

The adder-circuit 25 executes an addition between the one-line-delayed composite-video-signal and the two-line-delayed composite-video-signal. The signal added is output to the first selector 33.

The second subtracting-circuit 27 executes a subtraction of the two-line-delayed composite-video-signal from the one-line-delayed composite-video-signal. The signal subtracted is output to the second selector 35.

The first selector 33 chooses a signal to be output between the signal from the first subtracting-circuit 23 and the signal from the adder circuit 25 based on information on a signal from the correlation-determination-circuit 17. Specifically, the signal from the first subtracting-circuit 23 is output to the luminance-signal-output-terminal 37 when the "OFF" signal comes from the correlation-determination-circuit 17. When the "ON" signal comes from the correlation-determination-circuit 17, the signal from the adder circuit 25 is output to the luminance-signal-output-terminal 37.

The second selector 35 also chooses a signal to be output between the signal from the second BPF 21 and the signal from the second subtracting circuit 27 based on information of a signal from the correlation-determination-circuit 17. Specifically, the signal from the second BPF 21 is output to the color-signal-output-terminal 39 when "OFF" signal comes from the correlation determination circuit 17. When "ON" signal comes from the correlation determination circuit 17, the signal from the second subtracting circuit 27 is output to the color-signal-output-terminal 39.

The luminance-signal-output-terminal 37 is able to output the signal from the first selector 33. The color-signal-output-terminal 39 is able to output the signal from the second selector 35.

Figure 2A:
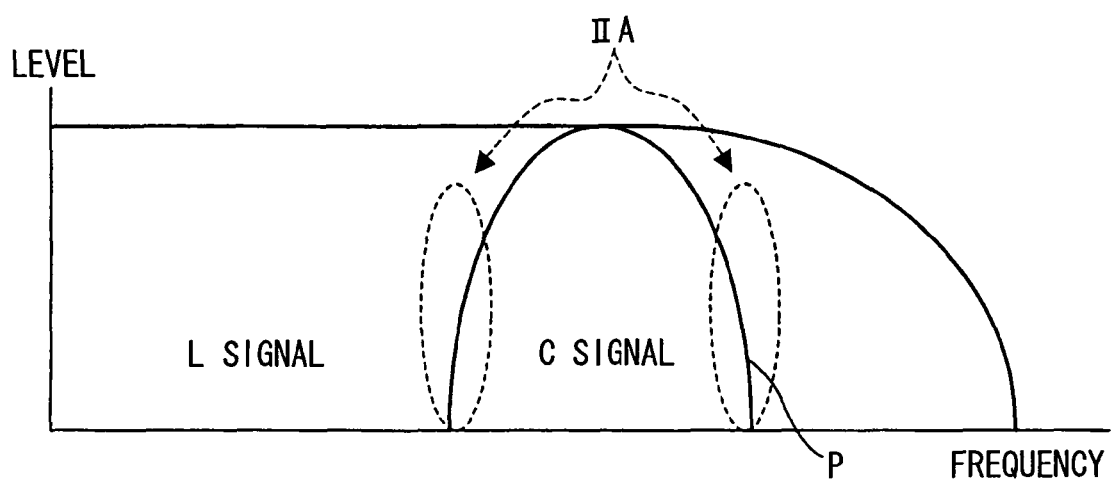
FIGS. 2A, 2B and 2C are graphs explaining characteristics of a first and a second BPFs.

FIG. 2A illustrates a level of a composite-video-signal as a function of frequencies. As shown in FIG. 2A, the color signal is disposed in the specific frequency band and is superposed on the luminance signal (see a solid curve P in the FIG. 2A). Although a filtering of signals along the curve P could separate the color signal and the luminance signal, it is difficult to execute a complete separation in a practical meaning because the color signal and luminance signal are mixed together on the region around the curve P. Moreover, as separation accuracy increases, circuits become more complicated. Here, the band where the two signals are mixed together shall be described as "the frequency bands of difficult separation" (that corresponds to IIA in FIG. 2A).

Figure 2B:
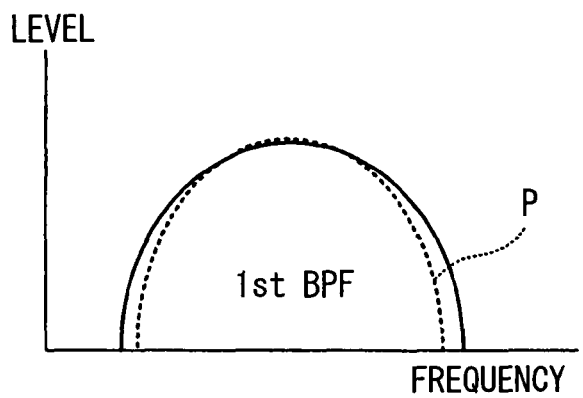

FIG. 2B shows a frequency characteristic of the first BPF 19. The frequency characteristic of the first BPF 19 is slightly wider than that shown as the curve P in FIG. 2A. This frequency range corresponds to the first predetermined frequency band. The first BPF 19 passes a signal component within "the frequency bands of the difficult separation". If a frequency characteristic of the first BPF 19 is too much wider than that shown as the curve P, too much luminance signal components are removed. This means that the luminance signal components are excessively eliminated, and therefore, necessary components may be eliminated. Thus, it is necessary to select a filter having an optimal characteristic in taking into account the size of a screen etc.

Figure 2C:
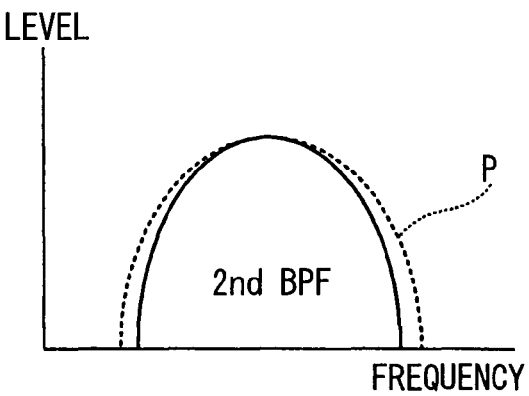

FIG. 2C shows a frequency characteristic of the second BPF 21. The frequency characteristic of the second BPF 21 is slightly narrower than that shown as the curve P in FIG. 2A. This frequency range corresponds to the second predetermined frequency range. Therefore, the second BPF 21 passes a signal component outside "the frequency bands of difficult separation". If a frequency characteristic of the second BPF 21 is too much narrower than that shown as the curve P, too many color signal components are removed. This means that the color signal components are excessively eliminated, and therefore, necessary components may be eliminated. Thus, it is necessary to select a filter having an optimal characteristic in taking into account the size of screen .etc.

The signal separator 1 operates as follows.

The first BPF 19 outputs a color signal including a signal component within "the frequency bands of difficult separation" (cf. FIG. 2B). The second BPF 21 removes the signal component within "the frequency bands of difficult separation" from the color signal including the signal component within "the frequency bands of difficult separation" (cf. FIG. 2C). Thus, the two BPFs produce a color signal that does not include the signal component within "the frequency bands of difficult separation".

The first subtracting circuit 23 outputs a luminance signal that does not include the signal component within "the frequency bands of difficult separation". This is because the first subtracting circuit 23 subtracts the output signal of the first BPF (which has the signal component within "the frequency bands of difficult separation") from the composite video signal.

A circuit having the first BPF 19, the second BPF 21 and first subtracting circuit 23 (i.e., a reformed BPF circuit) outputs the color and the luminance signals that do not include the signal component within "the frequency bands of difficult separation". The reformed comb filter circuit is able to suppress cross color and dot interference without using a large circuit.

The signal separator 1 includes a so-called comb filter that has the adder circuit 25 and the second subtracting circuit 27. The circuit for outputting the desired signal is chosen between the comb filter and the reformed BPF circuit based on the output signal of the correlation determination circuit 17. As mentioned previously, the correlation determination circuit 17 operates with the predetermined threshold value. Since the output signal of the reformed BPF circuit does not include a signal component within "the frequency bands of difficult separation", an adjustment of the threshold value is easier than a conventional circuit.

Second Embodiment

Figure 3:
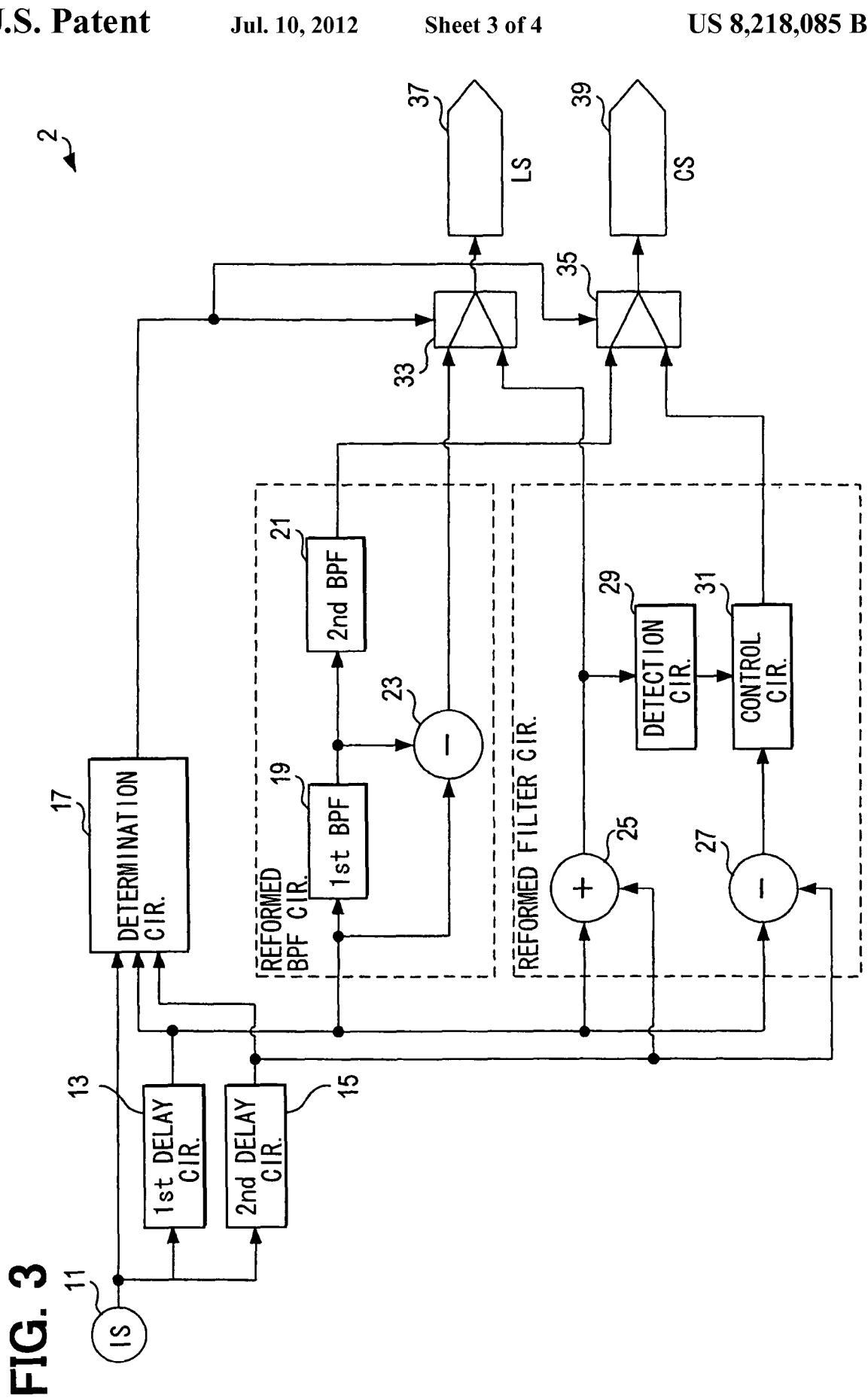
FIG. 3 is a schematic block diagram of a signal separator 2 according to a second embodiment.

FIG. 3 shows a schematic block diagram of a signal separator 2. The main difference between the signal separator 1 of the first embodiment and the signal separator 2 of the second embodiment are as follows. The output signal of the adder circuit 25 is input into a frequency detection circuit 29 in the separator 2. An output signal of the frequency detection circuit 29 is input into a gain-control circuit in the separator 2. An output signal of the second subtracting circuit 27 is input into a gain control circuit 27 in the separator 2. A signal being controlled its gain by the gain control circuit 27 is output to the second selector 35 in the separator 2.

The frequency detection circuit 29 is described as the combination of a band-pass filter (i.e., BPF) and a trap filter. The frequency characteristics of the BPF, the trap filter and the frequency detection circuit 19 are illustrated in FIG. 4A, FIG. 4B and FIG. 4C, respectively.

Figure 4A:
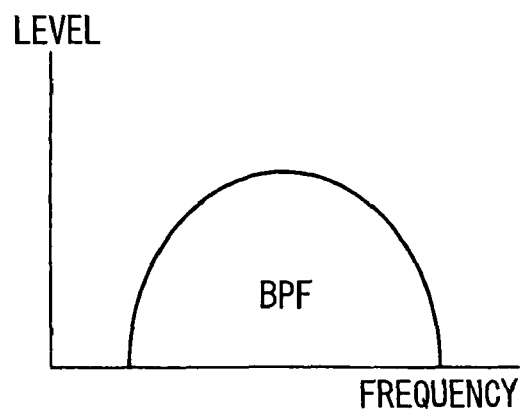
FIGS. 4A, 4B and 4C are graphs explaining characteristics of a frequency detection circuit.

A frequency characteristic of the BPF illustrated in FIG. 4A is similar to that shown as the curve P in FIG. 2A. The trap filter having the characteristic shown in FIG. 4B dumps a specific frequency band. The band to be dumped partly overlaps the curve P in FIG. 2A.

Figure 4B:
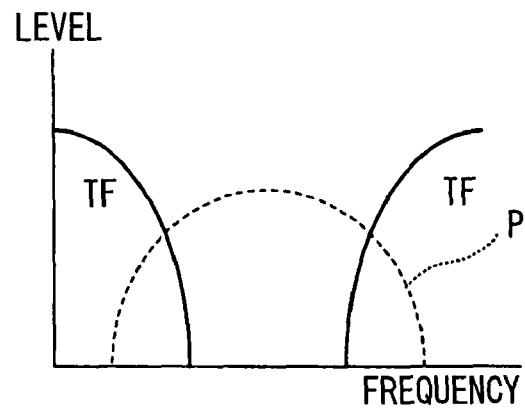
Figure 4C:
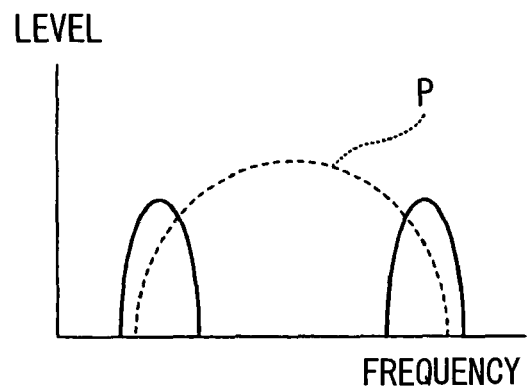

FIG. 4C shows a frequency characteristic of the circuit that is described as the combination of the BPF shown in FIG. 4A and the trap filter shown in FIG. 4B. The combination circuit is able to pass only a signal component around both ends of the curve P (a signal component around "the frequency bands of difficult separation").

Specifically, the function of the frequency-detection-circuit 29 is such that it outputs a voltage to a gain-control-circuit 31 when the signal being input into the frequency-detection-circuit 29 includes a signal component around both ends of the curve P, which is disposed within "the frequency bands of difficult separation". The frequency detection circuit 29 is a sort of a control signal generator.

The gain-control-circuit 31 controls the gain of the signal from the second subtracting-circuit 27 based on a voltage input from the frequency-detection-circuit 29. Then, the gain-control-circuit 31 output the controlled signal to the second selector 35. Specifically, the gain-control-circuit 31 reduces the gain of the signal from the second subtracting-circuit 27 when a voltage is input from the frequency-detection-circuit 29. The gain-control circuit is composed of, for example, an adder circuit or a dividing circuit.

The second selector 35 chooses a signal to be output between the signal from the second BPF 21 and the signal from the gain control circuit 31 based on information of a signal from the correlation-determination-circuit 17. Specifically, the signal from the second BPF 21 is output to the color-signal-output-terminal 39 when "OFF" signal comes from the correlation determination circuit 17. When the "ON" signal comes from the correlation determination circuit 17, the signal from the gain control circuit 31 is output to the color-signal-output-terminal 39.

The signal separator 2 operates as follows.

The first BPF 19 outputs a signal including a signal component within "the frequency bands of difficult separation" (cf. FIG. 2B). The second BPF 21 removes a signal component within "the frequency bands of difficult separation" from a color signal including a signal component within "the frequency bands of difficult separation" (cf. FIG. 2C). Thus, the two BPFs produce a color signal that does not include a signal component within "the frequency bands of difficult separation".

The first subtracting circuit 23 outputs a luminance signal that does not include a signal component within "the frequency bands of difficult separation" because the first subtracting circuit 23 subtracts the output signal of the first BPF (which includes a signal component within "the frequency bands of difficult separation") from the composite video signal.

A circuit having the first BPF 19, the second BPF 21 and first subtracting circuit 23 (a reformed BPF circuit) outputs the color and the luminance signals that do not include a signal component within "the frequency bands of difficult separation". The reformed comb filter circuit suppresses cross color and dot interference.

An addition of composite video signals between lines cancels a color signal component and produces a signal including only a luminance-signal component in the case of little differences of the composite video signals between the lines.

This is because color signal components within composite-video-signals are opposite phases between the lines. Thus a luminance signal is output from the adder-circuit 25.

A subtraction of composite-video-signals between lines removes a luminance signal component and produces a color signal of twice amplitude in the case of little differences of the composite video signals between the lines. Therefore a color signal is output from the second subtracting-circuit 27.

The frequency-detection-circuit 29 detects a frequency-band of the luminance-signal from the adder-circuit 25. Based on information of a signal from the frequency-detection-band 29, the gain control circuit 31 controls a level of the color signal from the second subtracting-circuit 27.

Conventionally, at the moment that a part of the luminance signal is within "the frequency bands of difficult separation", an output color signal of a comb filter includes a signal component of a luminance signal. In other words, at the moment stated above, a wrong color signal (i.e., cross color signal) is given in many cases. However, the reduction of the color signal level is able to let audiences hardly recognize the quality loss of video due to cross color.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A signal separator for separating a luminance signal and a color signal from a composite video signal, the separator comprising:

a first band pass element for passing a part of the composite video signal within a color signal band and within a predetermined frequency band, and outputting a filtered signal as a first filtered signal;

a second band pass element for passing a part of the first filtered signal within the color signal band and without the predetermined frequency band, and outputting a filtered signal as a second filtered signal; and a first subtraction element for subtracting the first filtered signal from the composite video signal, and outputting a subtracted signal as a first subtraction signal, wherein the predetermined frequency band is a frequency range in which the color signal and the luminance signal in the composite video signal are mixed together, the predetermined frequency band is disposed along a boundary curve between the color signal and luminance signal, wherein:

the first band pass element is characterized by a frequency response given by a first curve, the second band pass element is characterized by a frequency response given by a second curve, the first curve is wider than the boundary curve between the color signal and the luminance signal, the second curve is narrower than the boundary curve between the color signal and the luminance signal, and the first curve and the second curve therebetween have a frequency region that substantially corresponds to the predetermined frequency band.

2. The signal separator according to claim 1, wherein the second filtered signal provides the color signal and the first subtraction signal provides the luminance signal.

3. The signal separator according to claim 1, wherein the predetermined frequency band corresponds to a frequency range in which the color signal and the luminance signal are mixed together.

4. A signal separator for separating a luminance signal and a color signal from a composite video signal, the separator comprising:

a first line delay element for delaying the composite video signal by one line period, and outputting a delayed signal as a first delay signal;

a second line delay element for delaying the composite video signal by two line periods, and outputting a delayed signal as a second delay signal;

a correlation determination element for determining a correlation among the composite video signal, the first delay signal and the second delay signal, and outputting a determined correlation as a correlation signal;

a first band pass element for passing a part of the first delay signal within a color signal band and within a predetermined frequency band, and outputting a filtered signal as a first filtered signal;

a second band pass element for passing a part of the first filtered signal within the color signal band and without the predetermined frequency band, and outputting a filtered signal as a second filtered signal;

a first subtraction element for subtracting the first filtered signal from the first delay signal, and outputting a subtracted signal as a first subtraction signal;

an adder element for adding the first and second delay signals, and outputting an added signal as a addition signal;

a second subtraction element for subtracting the second delay signal from the first delay signal, and outputting a subtracted signal as a second subtraction signal;

a first selector for selecting one of the first subtraction signal and the addition signal base on the correlation signal, and outputting a selected signal as the luminance signal; and a second selector for selecting one of the second filtered signal and the second subtraction signal based on the correlation signal, and outputting a selected signal as the color signal, wherein the predetermined frequency band is a frequency range in which the color signal and the luminance signal in the composite video signal are mixed together, and the predetermined frequency band is disposed along a boundary curve between the color signal and the luminance signal.

5. The signal separator according to claim 4, wherein the predetermined frequency band corresponds to a frequency range in which the color signal and the luminance signal are mixed together.

* * * * *